United States Patent [19]

Seyferth et al.

[11] 3,899,523

[45] Aug. 12, 1975

[54] SILACYCLOPROPANES AND METHOD

[75] Inventors: Dietmar Seyferth, Lexington, Mass.;
Robert L. Lambert, Jr., St. Paul, Minn.

[73] Assignee: Massachusetts Institute of Technology, Cambridge, Mass.

[22] Filed: Nov. 28, 1973

[21] Appl. No.: 419,502

[52] U.S. Cl....260/448.2 D; 260/46.5 R; 260/46.5 P; 252/49.6; 252/63.7
[51] Int. Cl.............................................. C07b 7/08
[58] Field of Search ............... 260/448.2 D, 448.2 E

[56] References Cited
UNITED STATES PATENTS

| | | | |
|---|---|---|---|
| 2,607,791 | 8/1952 | Goodwin, Jr. | 260/448.2 D |
| 3,046,291 | 7/1962 | Sommer | 260/448.2 D |
| 3,398,178 | 8/1968 | Nelson | 260/448.2 D |

*Primary Examiner*—Paul F. Shaver
*Attorney, Agent, or Firm*—Arthur A. Smith, Jr.; Martin M. Santa; Paul J. Cook

[57] ABSTRACT

Silacyclopropanes having the following formula are provided:

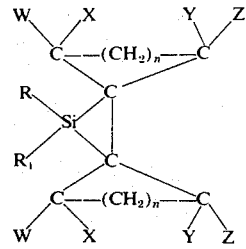

(IV)

wherein R and $R_1$ can be the same or different and can be hydrogen, alkyl, aryl, substituted alkyl or substituted aryl; n is an integer from 0 to 10; W, X, Y and Z can be hydrogen, alkyl, aryl, substituted alkyl, substituted aryl or W and X or Y and Z on the same ring constituent can be $-(CH_2)_m-$ wherein m is an integer from 1 to 10. The silacyclopropanes are formed by reacting a bromolithiated compound of the formula:

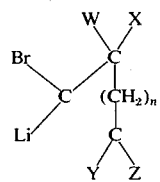

with a dihalosilane of the formula:

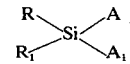

wherein A and $A_1$ are halo and debrominating the resulting product with zinc or magnesium in tetrahydrofuran.

14 Claims, No Drawings

SILACYCLOPROPANES AND METHOD

This invention relates to thermally stable silacyclopropanes and to their methods of preparation.

Prior to the present invention, silacycloalkanes which have at least four atoms in the ring portion of the compound have been prepared. However, prior attempts to form silacyclopropanes that are stable at normal room temperatures and above have not been successful.

The present invention is based on the discovery that thermally stable silacyclopropanes can be formed when the carbon atoms of the ring portion of the molecule are linked to a cyclic radical. The silacyclopropanes produced in accordance with this invention are thermally stable in that, in the absence of oxygen they do not undergo substantial decomposition at normal room temperatures and, in fact, can be distilled under reduced atmospheric pressures without substantial decomposition. The products of this invention can be polymerized to form lubricants, resins or dielectric fluids.

The compounds of this invention are represented by formula IV:

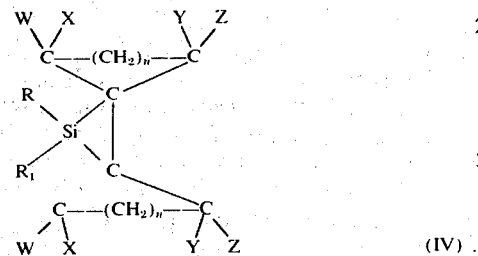

wherein R and $R_1$ can be the same or different and can be hydrogen, alkyl, such methyl, ethyl, propyl, butyl, heptyl, isopropyl or the like: aryl such as phenyl, naphthyl or the like; substituted alkyl such as hydroxyalkyl, aminoalkyl or the like or substituted aryl such as tolyl, xylyl, cresyl, aminophenyl, hydroxyphenyl or the like, n is an integer from 0 to 10; W, X, Y and Z can be hydrogen, alkyl, aryl, substituted alkyl, substituted aryl as exemplified for R or $R_1$ or W and X or Y and Z on the same ring constituent can be —$(CH_2)_m$— wherein m is an integer from 1 to 10.

The process for forming the compounds of this invention is represented by the following equations:

In the equations, A and $A_1$ are halogen and can be the same or different.

As represented by Equation I, the dibromocycloalkane represented by formula (I) is reacted with an alkyllithium compound in a tetrahydrofuran-containing solvent. The reaction is conducted under conditions to form the lithiated cycloalkane represented by formula (II) without substantial decomposition thereof. Generally, this reaction is conducted under normal atmospheric pressures at a temperature between about $-70°C$ and about $-140°C$ with the exclusion of air and moisture. The solvent employed comprises tetrahydrofuran alone or tetrahydrofuran admixed with a diluent such as dimethyl ether, diethyl ether, pentane or the like. This reaction also can be carried out with an alkylmagnesium halide compound, preferably isopropyl magnesium chloride rather than the alkyllithium compound under essentially the same conditions to obtain the corresponding magnesium bromide-substituted cycloalkane. In addition the reaction can be carried out by substituting for the dibromocycloalkane a chlorobromocycloalkane or a dichlorocycloalkane.

As represented by Equation II, the lithiated cycloalkane is reacted with a dihalosilane to form the dibrominated silaorgano compound represented by Formula (III). Subsequently, the reaction mixture is hydrolyzed to dissolve the lithium halide by product obtained. It is convenient to carry out this hydrolysis reaction with aqueous ammonium chloride solution, at a temperature between 0°C and 30°.

As represented by Equation III, the dibrominated silaorgano compound is reacted with magnesium or zinc under debromination conditions to form the cyclopropane ring. This reaction is conducted in the presence of magnesium or zinc particles in a solvent for the silaorgano compound such as tetrahydrofuran, diethyl ether or the like. This reaction is carried out at a temperature within the range of 0°C to 60°C in the absence of oxygen, preferably in an inert atmosphere such as nitrogen or a rare gas, in order to prevent excessive degradation of the product formed. The compounds of this invention are liquids or crystalline solids and are highly reactive by cleavage at one of the siliconcarbon bonds in the silicon-containing ring portion of the molecule.

The following examples illustrate the present invention and are not intended to limit the same.

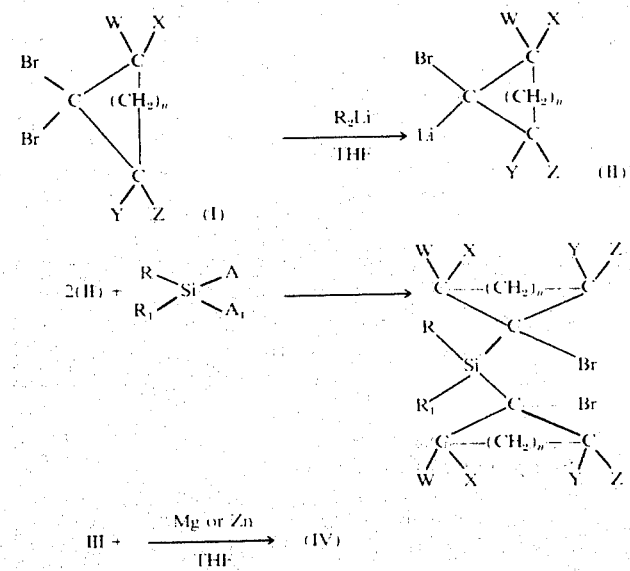

Equation I

Equation II

Equation III

EXAMPLE I

The compound 7, 7-dibromobicyclo[4.1.0]heptane (40.0 grams, 147 mmol) was reacted with 150 mmol of n-butyl lithium in tetrahydrofuran at −95°C to form a solution of 7-lithio-7-bromo bicyclo[4.1.0]heptane. The latter then was treated with dimethyldichlorosilane (9.0 ml) to form bis(7-bromo-7-norcaranyl) dimethylsilane having a melting point of 114°–116°C which was purified by crystallization from methanol. This silicon compound then was dissolved in tetrahydrofuran and slowly added to magnesium turnings in THF at room temperature. The reaction mixture was stirred under nitrogen at room temperature for 10 hours. The organic layer was decanted under nitrogen and the solid remaining was extracted with pentane. Distillation of the combined organic solutions gave a white crystalline solid, dispiro [bicyclo[4.1.0] heptane -7-2'-dimethylsilacyclopropane-3', 7''-bicyclo[4.1.0] heptane], b.p. 95°–97°C (0.01mm), m.p. 72°–74°C, in 75–80% yield. The product is air sensitive but is stable under nitrogen atmosphere. The product was methyoxylated readily with methanol by cleavage of one of the silicon-ring carbon bonds to give:

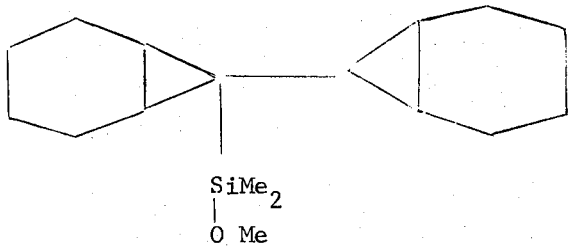

EXAMPLE II

The procedure of Example I was repeated except that 1, 1-dibromo-2,2-dimethylcyclopropane was reacted with n-butyllithium in the first step. The yield of the final product 1, 1-dimethyl-trans-2,3-bis(2',2'-dimethyl-1'-cyclopropylidene)-1-silacyclopropane was 45%. The product was a liquid, b.p. 50°–51°C (3.5mm), which readily oxidized when contacted with oxygen, and readily methoxylated with methanol at room temperature by cleavage of one of the silicon-ring carbon bonds.

EXAMPLE III

The procedure of Example I was repeated except that 1,1-dibromo-trans-2,3-dimethylcyclopropane was reacted with n-butyllithium in the first step. The yield of the silacyclopropane product 1,1-dimethyl-anti-2,3-bis(trans-2',3'-dimethyl-1'-cyclopropylidene)-1-silacyclopropane was 45%. The product was a liquid, b.p. 50°–51°C at 2.6mm is very reactive toward oxygen and is readily methoxylated with methanol by cleavage of one of the silicon-ring carbon bonds.

EXAMPLE IV

The procedure of Example I was repeated except that 7,7-dichlorobicyclo [4.1.0] heptane was reacted with n-butyllithium under the same conditions of temperature, concentration of reactants, etc. The remaining reaction steps were conducted as described in Example I with the result that the same product was obtained in approximately the same yield.

EXAMPLE V

The procedure of Example I was repeated except that 7-bromo,7-chlorobicyclo [4.1.0] heptane was reacted with n-butyllithium under the same conditions of temperature, concentration of reactants, etc. The remaining reaction steps were conducted as described in Example I with the result that the same product was obtained in approximately the same yield.

We claim:

1. A silacyclopropane of the formula:

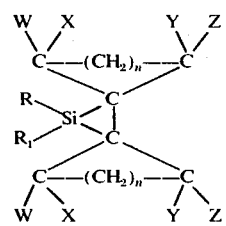

wherein R and $R_1$ can be the same or different and are hydrogen, alkyl, aryl, substituted alkyl or substituted aryl; n is an integer from 0 to 10; W, X, Y and Z are hydrogen, alkyl, aryl, substituted alkyl, substituted aryl or W and X and Y and Z on the same ring constituent can be $-(CH_2)_m-$ wherein m is an integer from 1 to 10.

2. The silacyclopropane of claim 1 wherein n is 0 and W and X and Y and Z are $-(CH_2)_m-$ wherein m is 4.

3. The silacyclopropane of claim 2 wherein R and $R_1$ are methyl.

4. The silacyclopropane of claim 1 wherein n is 0, W and X are methyl and Y and Z are hydrogen.

5. The silacyclopropane of claim 4 wherein R and $R_1$ are methyl.

6. The silacyclopropane of claim 1 wherein n is 0, W and Y are methyl and X and Z are hydrogen.

7. The silacyclopropane of claim 6 wherein R and $R_1$ are methyl.

8. The process for forming the compound of claim 1 which comprises reacting in the absence of oxygen and moisture a compound of the formula:

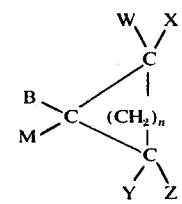

wherein M is lithium or $-M_gBr$ and B is bromo or chloro with a compound of the formula:

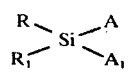

wherein A and $A_1$ are halogen substituents to form a first product of the formula:

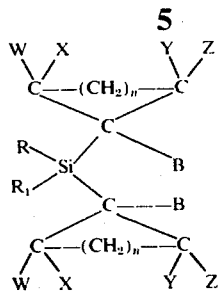

and reacting said first product with zinc or magnesium to remove the substituents, B and wherein any substituents of R, $R_1$, W, X, Y and Z are inert under the conditions maintained during said reacting steps.

9. The process of claim 8 wherein $n$ is O and W and X and Y and Z are—$(CH_2)_m$—wherein m is 4.

10. The process of claim 9 wherein R and $R_1$ are methyl.

11. The process of claim 1 wherein $n$ is O, W and X are methyl and Y and Z are hydrogen.

12. The process of claim 11 wherein R and $R_1$ are methyl.

13. The process of claim 8 wherein $n$ is O, W and Y are methyl and X and Z are hydrogen.

14. The process of claim 13 wherein R and $R_1$ are methyl.

* * * * *